(12) United States Patent
Garcia et al.

(10) Patent No.: US 12,139,971 B2
(45) Date of Patent: Nov. 12, 2024

(54) HYDRAULIC DRY MATE CONNECTORS WITH SHAPE MEMORY ALLOY TECHNOLOGY

(71) Applicant: Schlumberger Technology Corporation, Sugar Land, TX (US)

(72) Inventors: Jean-Luc Garcia, Courcouronnes (FR); Thomas Evrard, Montmorency (FR); Nicolas Soen, Brière les Scéllés (FR); Surya Perdana Simanjuntak, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/254,899

(22) PCT Filed: Nov. 30, 2021

(86) PCT No.: PCT/US2021/061188
§ 371 (c)(1),
(2) Date: May 30, 2023

(87) PCT Pub. No.: WO2022/115780
PCT Pub. Date: Jun. 2, 2022

(65) Prior Publication Data
US 2024/0026741 A1    Jan. 25, 2024

Related U.S. Application Data

(60) Provisional application No. 63/119,381, filed on Nov. 30, 2020.

(51) Int. Cl.
*E21B 17/02*    (2006.01)
*F03G 7/06*    (2006.01)
(Continued)

(52) U.S. Cl.
CPC ............ *E21B 17/02* (2013.01); *F03G 7/0614* (2021.08); *F16L 21/06* (2013.01); *F16L 21/08* (2013.01)

(58) Field of Classification Search
CPC ........ E21B 17/02; F03G 7/0614; F16L 21/06; F16L 21/08
See application file for complete search history.

(56) References Cited

U.S. PATENT DOCUMENTS 1,817,808 A * 8/1931 Eaton .................... F16L 15/001
411/277
2,181,343 A * 11/1939 Reimschissel .......... F16L 15/04
411/929

(Continued)

FOREIGN PATENT DOCUMENTS

WO    2008034762 A1    3/2008
WO    2014084826 A1    6/2014
(Continued)

OTHER PUBLICATIONS

International Search Report and Written Opinion issued in the PCT Application PCT/US2019/058142 dated Feb. 12, 2020 (13 pages).
(Continued)

*Primary Examiner* — Christopher J Sebesta
*Assistant Examiner* — Neel Girish Patel
(74) *Attorney, Agent, or Firm* — Jeffrey D. Frantz

(57) ABSTRACT

A technique facilitates formation of secure connections for use in downhole environments. According to an embodiment, a connector may be constructed as a dry mate connector which provides both a sealed connection and a connection able to withstand a predetermined tensile loading. The connector can include a shape memory alloy sealing system which may be activated to form a secure seal with a corresponding cable or other component feature.

9 Claims, 6 Drawing Sheets

(51) Int. Cl.
*F16L 21/06* (2006.01)
*F16L 21/08* (2006.01)

(56) References Cited

U.S. PATENT DOCUMENTS

| | | | | |
|---|---|---|---|---|
| 2,224,145 | A | * | 12/1940 | Dugan .................... F16L 13/08 |
| | | | | 228/229 |
| 3,666,586 | A | * | 5/1972 | Lacy ................... B29C 65/4835 |
| | | | | 156/304.6 |
| 4,204,739 | A | | 5/1980 | Shoenleben |
| 4,352,542 | A | | 10/1982 | Tydings |
| 4,415,169 | A | * | 11/1983 | Kim ........................ F16L 27/12 |
| | | | | 277/584 |
| 4,432,824 | A | * | 2/1984 | Cook .................... F16L 58/181 |
| | | | | 156/165 |
| 4,496,175 | A | * | 1/1985 | Morris .................. F16L 15/008 |
| | | | | 285/334 |
| 4,537,406 | A | * | 8/1985 | Hirasuna ............... F16L 15/007 |
| | | | | 277/609 |
| 4,598,455 | A | * | 7/1986 | Morris .................. F16L 15/007 |
| | | | | 285/15 |
| 4,773,680 | A | | 9/1988 | Krumme |
| 4,880,343 | A | | 11/1989 | Matsumoto |
| 5,415,441 | A | * | 5/1995 | Kilgore .................... E21B 17/04 |
| | | | | 285/330 |
| 5,478,970 | A | * | 12/1995 | Lawler ................. H01R 13/523 |
| | | | | 174/77 R |
| 5,714,738 | A | | 2/1998 | Hauschulz |
| 9,000,296 | B2 | | 4/2015 | Mueller et al. |
| 9,071,008 | B2 | | 6/2015 | Zillinger et al. |
| 9,722,400 | B2 | | 8/2017 | Koppe et al. |
| 9,771,791 | B2 | | 9/2017 | Schulz et al. |
| 11,725,461 | B2 | | 8/2023 | Garcia |
| 2002/0074742 | A1 | * | 6/2002 | Quoiani ................ F16J 15/0806 |
| | | | | 277/627 |
| 2003/0111796 | A1 | * | 6/2003 | Kohli .................... E21B 17/028 |
| | | | | 277/322 |
| 2007/0114042 | A1 | * | 5/2007 | Heinonen ............... E21B 17/02 |
| | | | | 166/382 |
| 2008/0061510 | A1 | * | 3/2008 | Li .......................... E21B 33/10 |
| | | | | 166/387 |
| 2008/0231042 | A1 | * | 9/2008 | Brayman .............. B23P 11/025 |
| | | | | 285/41 |
| 2010/0006303 | A1 | | 1/2010 | Garcia et al. |
| 2010/0193200 | A1 | * | 8/2010 | Rioufol ............... E21B 17/1035 |
| | | | | 166/387 |
| 2014/0374167 | A1 | * | 12/2014 | Mueller ................ E21B 17/003 |
| | | | | 175/308 |
| 2016/0076312 | A1 | | 3/2016 | Fraczek et al. |
| 2016/0258248 | A1 | * | 9/2016 | MacDonald .......... E21B 17/046 |
| 2016/0326812 | A1 | * | 11/2016 | Hanton .................. E21B 17/05 |
| 2018/0259100 | A1 | * | 9/2018 | Williamson ............ F16L 15/06 |
| 2019/0003265 | A1 | * | 1/2019 | McLaughlin .......... E21B 17/04 |
| 2020/0240235 | A1 | * | 7/2020 | Fripp ..................... E21B 33/10 |
| 2021/0032942 | A1 | * | 2/2021 | Gordon ............... E21B 17/1057 |

FOREIGN PATENT DOCUMENTS

| | | |
|---|---|---|
| WO | 2019222823 A1 | 11/2019 |
| WO | 2020087001 A1 | 4/2020 |

OTHER PUBLICATIONS

Hydraulic Dry Mate Connector (2016) at https://www.slb.com/-/media/files/co/product-sheet/wellwatcher-hydraulic-dry-mate-connector-ps.ashx, (1 page, downloaded on Apr. 23, 2021).

Intellitite (2014) at https://www.slb.com/-/media/files/co/product-sheet/intellitite-edmc-ps.ashxEDMC-R (1 page, downloaded on Apr. 23, 2021).

International search Report and Written Opinion issued in the PCT Application PCT/US2021/061188, dated Mar. 21, 2022 (10 pages).

* cited by examiner

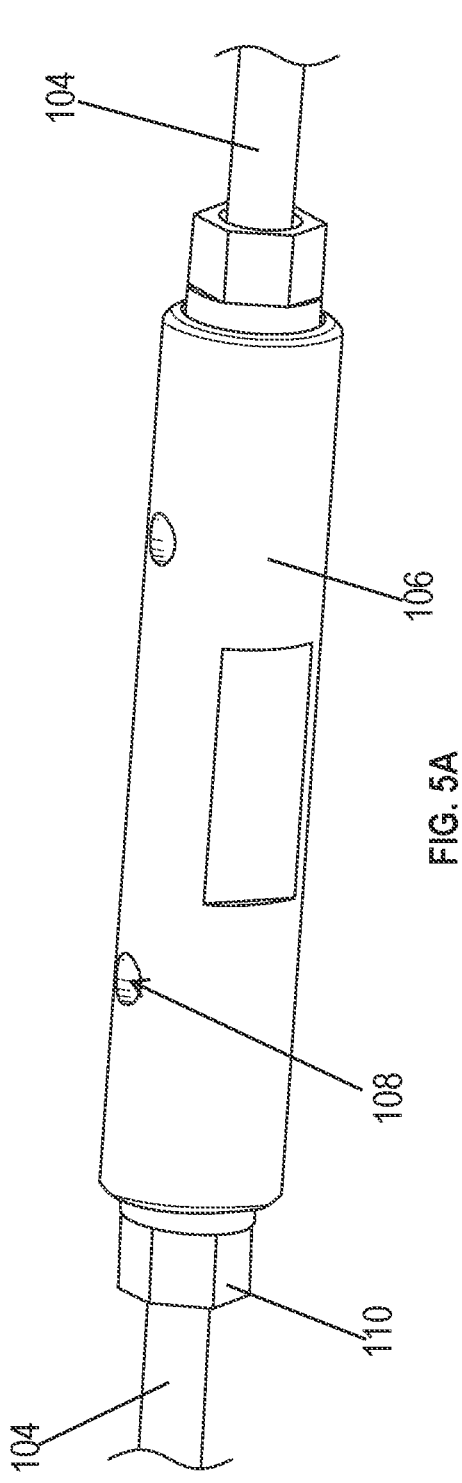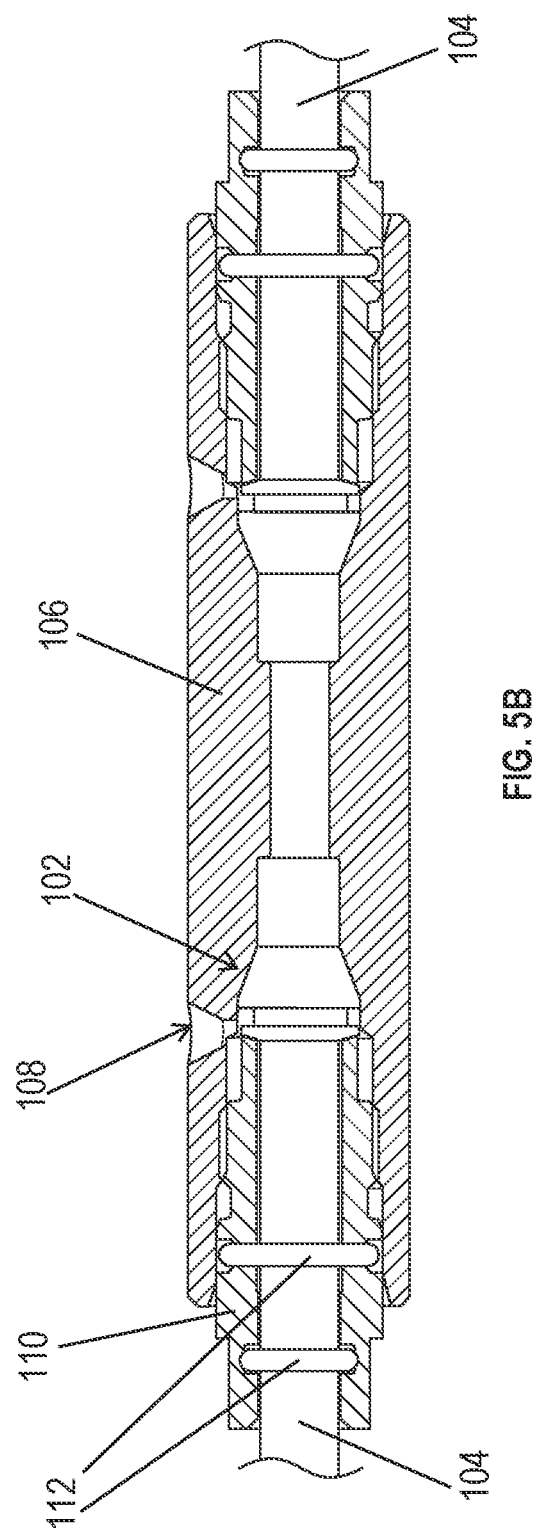

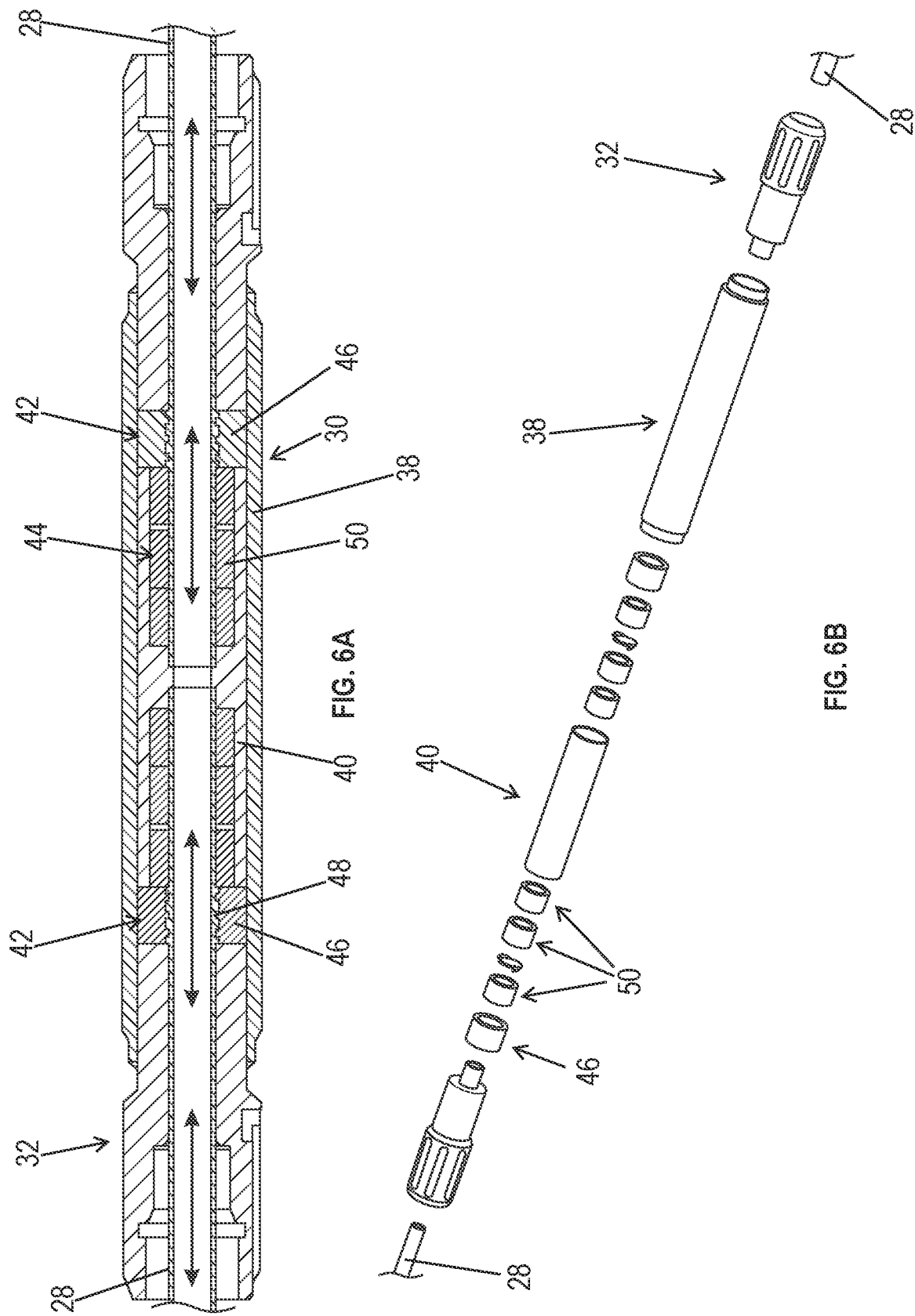

HYDRAULIC DRY MATE CONNECTORS WITH SHAPE MEMORY ALLOY TECHNOLOGY

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a National Stage Entry of International Patent Application No. PCT/US2021/061188, filed on Nov. 30, 2021, which claims priority benefit of U.S. Provisional Application No. 63/119,381, filed on Nov. 30, 2020, the entirety of which is incorporated by reference herein and should be considered part of this specification.

BACKGROUND

Field

The present disclosure generally relates to dry mate connectors, and more particularly to systems and methods for permanently splicing hydraulic control lines with shape memory alloy technology.

Description of the Related Art

In many well applications, connectors are used to connect various components which are utilized in a downhole environment. In some downhole applications, dry mate connectors may be permanently installed to form, for example, a cable splice between sections of cable or between a device and a corresponding cable. However, difficulties can arise in forming a connection/splice which is able to remain sealed with respect to the surrounding environment while also withstanding tensile loading, e.g. tensile loading occurring during tensile load testing.

SUMMARY

In general, a system and methodology are provided for forming secure connections for use in downhole environments. According to an embodiment, a connector may be constructed as a dry mate connector that provides both a sealed connection and a connection able to withstand a predetermined tensile loading. The connector comprises connector ends combined with an outer connector housing. Additionally, the connector can comprise a shape memory alloy sealing system, which may be activated to form a secure seal with a corresponding cable or other component feature. The connector can also comprise a shape memory alloy retainer system, which may be activated to securely grip the corresponding cable or other component feature so as to withstand substantial tensile loading acting on the corresponding cable or other component feature.

In some configurations, a system for use in a well includes: a pair of hydraulic control line sections joined via a coupling; and a connector slid over the coupling to ensure a secure, sealed connection of the pair of hydraulic control line sections, the connector comprising: an external housing joined to a pair of coupler ends, each coupler end being combined with a sealing system and a separate retainer system, the sealing system and the separate retainer system each being formed at least in part of a shape memory alloy material selectively activatable to seal against and grip the pair of hydraulic control line sections.

The shape memory alloy material can be a metal alloy material that is activatable via application of heat. The sealing system can include a ring clamp having internal sealing teeth. The retainer system can include a plurality of retainer rings. Each retainer ring can include internal and external gripping surfaces. The connector can be a dry mate type connector. The coupler ends can be secured to the external housing via weldments. The external housing can include an outer housing section and an inner housing.

In some configurations, a dry mate connector includes: a connector body comprising a first axial end and a second axial end, the first axial end configured to receive an end portion of a first control line, and the second axial end configured to receive an end portion of a second control line; a first set of one or more retainer rings disposed radially between the end portion of the first control line and the connector body; a second set of one or more retainer rings disposed radially between the end portion of the second control line and the connector body; a first pair of sealing components, one of the first pair of sealing components disposed at each axial end of the first set of one or more retainer rings such that the first set of one or more retainer rings is axially bounded by the first pair of sealing components, the first pair of sealing components disposed radially between the end portion of the first control line and the connector body; and a second pair of sealing components, one of the second pair of sealing components disposed at each axial end of the second set of one or more retainer rings such that the second set of one or more retainer rings is axially bounded by the second pair of sealing components, the second pair of sealing components disposed radially between the end portion of the second control line and the connector body.

The retainer rings of the first and second sets of one or more retainer rings can include a shape memory alloy material selectively activatable to grip the end portions of the first and second control lines, respectively. The sealing components of the first and second pairs of sealing components can be formed at least in part of a shape memory alloy material selectively activatable to seal against the end portions of the first and second control lines, respectively. Each of the sealing components can include a ring clamp having internal sealing teeth. The ring clamps can include a shape memory alloy material. The sealing teeth can include a non-shape memory alloy material. The shape memory material can be a metal alloy material activatable via application of heat. The connector body can include an outer housing section and two inner housing sections, one of the inner housing sections disposed radially between the first set of retaining rings and the outer housing section, and the other inner housing section disposed radially between the second set of retaining rings and the outer housing section. The connector can be a hydraulic dry mate connector, and the first and second control lines can be first and second hydraulic lines.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

FIG. 5A shows a perspective view of an example existing hydraulic dry mate connector (HDMC).

FIG. 5B shows a longitudinal cross-section of the HDMC of FIG. 5A.

FIG. 6A shows a longitudinal cross-section of an example hydraulic dry mate connector used to connect two pieces or sections of hydraulic control lines according to the present disclosure.

FIG. 6B shows an exploded view of the connector of FIG. 6A.

DETAILED DESCRIPTION

Figure 1:
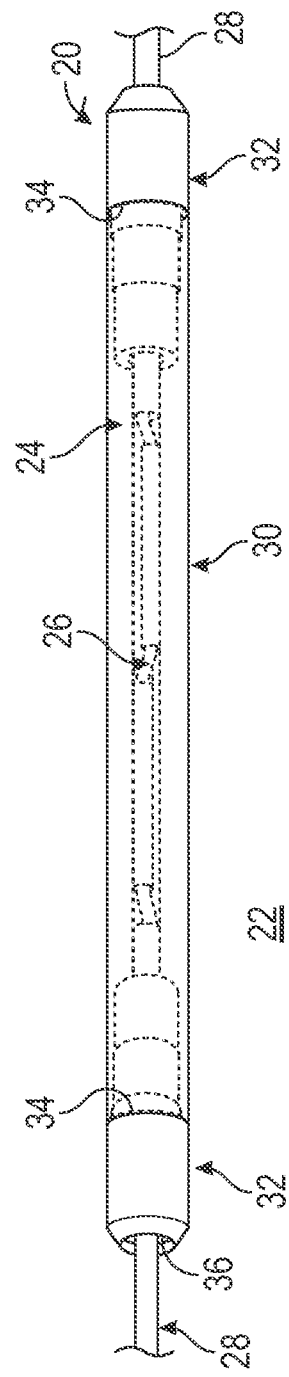
FIG. 1 is an illustration of an example of a connector connecting two components, e.g., two sections of permanent downhole cable, via a shape memory alloy sealing system and a shape memory alloy retainer system, according to an embodiment of the disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

The present disclosure herein generally provides systems and methods for forming secure connections for use in downhole environments, for example, connections of two permanent hydraulic control lines for permanent or non-permanent applications. According to some embodiments, a connector may be constructed as a dry mate connector that provides both a sealed connection and a connection able to withstand a predetermined tensile loading, high vibration (e.g., during well production (hydrocarbon flow)), and/or compression loads due to high pressure and/or temperature. The control lines may be employed along, for example, a well completion system.

FIGS. 5A-5B show an example existing hydraulic dry mate connector (HDMC). As shown, two hydraulic control lines 104 are joined via a housing or splice body 106. An end portion of one of the control lines 104 extends into each end of the body 106. In the illustrated configuration, each control line 104 extends through a bolt 110 at least partially disposed within the body 106, such that the bolt 110 can help secure the control line 104 within and to the body 106. This design includes swaging ferrules 102 between the control lines 104 themselves and the splice body 106. The connector can also include one or more pressure ports 108 and one or more o-rings 112 that can enable pressure testing.

Forming a connection using a connector such as that shown in FIGS. 5A-5B can take a relatively long time. The present disclosure provides a new splice or cable head connector to be deployed in wells. Systems and methods according to the present disclosure can advantageously simplify the preparation of the cable (or control line) and the number of parts to operate, thereby reducing the time needed for installation. For example, systems and methods according to the present disclosure can reduce the time needed for installation from around 4-6 hours to around 1.5-2 hours, which can reduce rig time and costs.

FIGS. 1-4 show systems and methods for forming a control line (e.g., electrical or hydraulic control line) dry mate connection. According to an embodiment, the connector comprises connector ends combined with an outer connector housing. Additionally, the connector comprises a shape memory alloy sealing system, which may be positioned within the outer housing. The shape memory alloy sealing system is activated to form a secure seal with a corresponding cable or other component feature. The connector can also comprise a separate shape memory alloy retainer system which may be activated to securely grip the corresponding cable or other component feature. The secure gripping enables the connector to withstand substantial tensile loading acting on the corresponding cable or other component feature, vibration during well production (hydrocarbon flow), and/or compression loads due to high pressure and temperature.

Activation of the shape memory materials forming the sealing system and/or the retainer system may be achieved via a suitable change in temperature, e.g. sufficient heating, or via other suitable activation techniques. The particular activation technique selected depends on the type of shape memory material employed. In a variety of applications, the shape memory material may be in the form of a shape memory metal alloy, e.g. a nickel-titanium alloy which is heat activated. The activation of the shape memory material (s) can be irreversible. In other words, once the shape memory material(s) is/are activated, the materials(s) cannot be made to revert to the in-activated shape or form.

According to one embodiment, the shape memory alloy sealing system may comprise seal teeth formed of the shape memory alloy. The seal teeth engage and seal against the outside of the corresponding cable (or other component feature) upon activation of the shape memory alloy so as to form a seal which prevents fluid from running along the outside of the cable. In some applications, the cable may be coupled with a sensor system, e.g. a gauge, via the connector. Activation of the shape memory alloy sealing system prevents fluid from running along the outside of the cable and getting into the gauge.

Additionally, the shape memory alloy retainer system may be formed in the shape of a ring or a plurality of rings which clamp down on the corresponding cable (or other component feature) upon activation of the shape memory alloy. The structure of the connector and the utilization of shape memory material for both sealing and retention enables construction of a relatively inexpensive connector which can be installed in a reduced amount of time.

In some embodiments, at least portions of the connector may be preassembled so as to facilitate easier installation in the field with a reduced chance for making mistakes during the installation process. Consequently, the connector can provide reliability gains relative to conventional connectors used in downhole environments and applications.

Referring generally to FIG. 1, an example of a connector 20 is illustrated as deployed in a downhole environment 22, e.g. a wellbore environment. The connector 20 is a dry mate type connector having a dry, e.g., air-filled, interior 24 for containing a coupling 26 of two sections of a control line 28, e.g., a cable splice 26 of two sections of an electrical cable 28 as shown in FIG. 1, or a coupling 26 of two sections of a hydraulic line 28. According to the illustrated embodiment, the connector 20 comprises an external housing 30 coupled with a pair of coupler ends 32 so as to enclose the interior 24 and the coupling 26. The coupler ends 32 may be secured to the external housing 30 via weldments 34 or other suitable coupling techniques, e.g., threaded engagement combined with seals.

The sections of control line 28 extend through the coupler ends 32 and into the interior 24 once the connector 20 is properly placed around the coupling 26. The connector 20 can be used to provide a sealed connection of two sections of control line 28, e.g., two permanent electrical or hydraulic sections of control line 28. Control line 28 may be a permanent downhole cable for use in downhole applications, e.g. a downhole wellbore application. In such applications, the connector 20 may serve as a permanently installed in-well dry mate connector. It should be noted the sections of control line 28 may comprise a variety of cables having different types and numbers of conductors located therein. By way of example, the sections of control line 28 may comprise mono-cables, twisted pair type cables, or cables having additional conductors, e.g., 4-wire cables, spliced together at coupling 26.

For some applications, qualifying the connector 20 and corresponding connected sections of control line 28 involves tensile testing. As explained in greater detail below, however, the shape memory alloy retainer system is readily able to handle the tensile loading associated with testing. The retainer system may be constructed to protect against slippage of the sections of control line 28 relative to connector 20 when the control line 28 and connector 20 are exposed to a variety of relatively large tensile forces.

Figure 2:
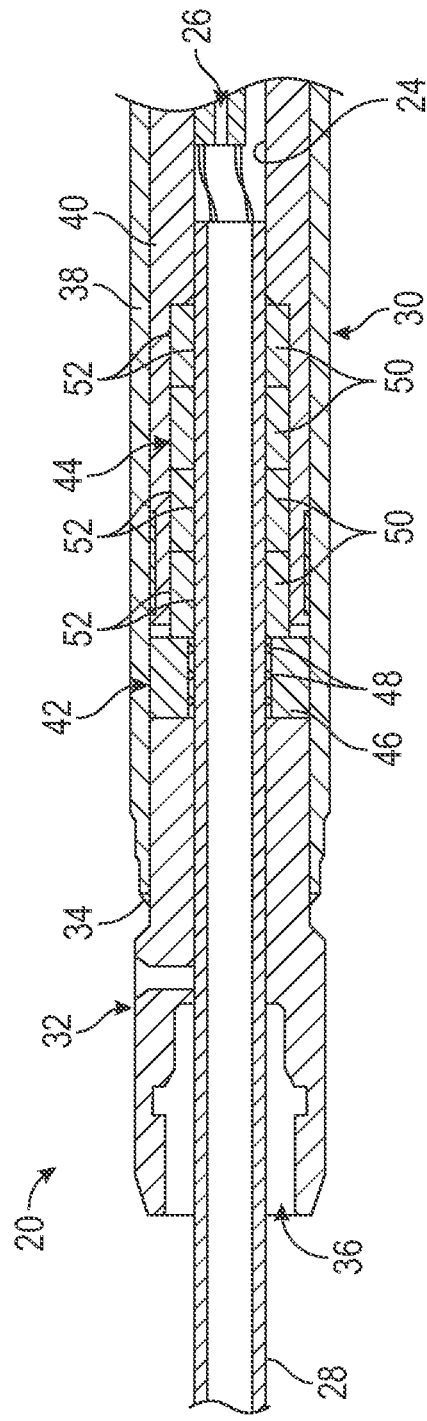
FIG. 2 is a cross-sectional illustration of a portion of the connector illustrated in FIG. 1, according to an embodiment of the disclosure

Referring generally to FIG. 2, the left side of connector 20 is illustrated in cross-section to facilitate explanation of the use of shape memory alloy materials. In this example, the left coupler end 32 is illustrated as having a passage 36 extending therethrough and sized to receive the corresponding section of control line 28. The corresponding section of control line 28 extends through the passage 36 and into interior 24 for coupling with the adjacent section of control line 28 via coupling 26.

In this example, the external housing 30 comprises an outer housing section 38 combined with an inner housing or subsection 40 disposed along the interior of outer housing section 38. The connector 20 also comprises a sealing system 42 formed of a shape memory material, e.g., a shape memory alloy, disposed between the corresponding section of control line 28 and the external housing 30. Additionally, the connector 20 comprises a retainer system 44 formed of a shape memory material, e.g., a shape memory alloy, disposed between the corresponding section of control line 28 and the external housing 30. The shape memory alloy may be a metal alloy, such as available shape memory metal alloys formed of nickel and titanium.

By way of example, the sealing system 42 may be in the form of a ring clamp 46 having internal sealing teeth 48. The ring clamp 46 and the internal sealing teeth 48 may be formed of the shape memory alloy material. However, in some embodiments, the ring clamp 46 may be constructed of the shape memory alloy material and the sealing teeth 48 may be constructed of a different type of material, or the sealing teeth 48 may be constructed of the shape memory alloy material and the ring clamp 46 may be constructed of a different type of material.

The ring clamp 46 is disposed around the corresponding section of control line 28 such that the sealing teeth 48 are oriented towards the control line 28. In this embodiment, the ring clamp 46 is captured radially between control line 28 and outer housing section 38 and is bounded axially by the corresponding coupler end 32 and inner housing 40, as illustrated. In some embodiments, a plurality of the ring clamps 46 may be used. The ring clamp(s) 46 are generally positioned proximate each coupler end 32 to form a seal on each side of coupling 26.

Regardless of the number of ring clamps 46, activation of the shape memory alloy sealing system, e.g., sufficient heating of the shape memory alloy material, causes the ring clamp(s) 46 to transition to an original configuration. For example, the ring clamp(s) 46 may expand to force the sealing teeth 48 in a radially inward direction. This transition forces the sealing teeth 48 radially inward until they are moved into sealing engagement with the exterior of the control line 28.

In the embodiment illustrated, the retainer system 44 may be formed of a retainer ring or a plurality of retainer rings 50, which are positioned between housing 30 and control line 28. By way of example, the retainer ring(s) 50 may be positioned radially between a wall of inner housing 40 and the control line 28. The retainer ring(s) 50 may similarly be formed of a suitable shape memory material, e.g., a shape memory alloy material, which can be activated via application of sufficient heat or via other suitable method of activation. Retainer rings 50 are generally positioned proximate each coupler end 32 to form a gripping engagement with the corresponding section of control line 28 on each side of coupling 26.

Each retainer ring 50 also may comprise internal and/or external gripping surfaces 52, e.g., surfaces with teeth, knurling, or other features to facilitate gripping of both housing 30 and the corresponding section of control line 28 upon activation of the shape memory alloy material. In some embodiments, the external gripping surfaces 52 may be formed via intermediate mechanical rings or devices located between the shape memory alloy rings 50 and the control line 28. The gripping surfaces 52 help increase the tensile load which can be applied to the coupled control line 28 before slippage occurs. It should be noted the ring or rings 50 also may be positioned at other appropriate locations to help reduce the potential for slippage.

With respect to the rings 50, activation of their shape memory material, e.g. application of sufficient heating to the shape memory alloy material, causes the retainer rings 50 to transition to an original configuration. For example, the retainer rings 50 may expand to force the gripping surfaces 52 in radial directions against the interior surface of inner housing 40 and against the exterior of control line 28. This transition securely grips the control line 28 with respect to coupler housing 30 to prevent the undesired slippage when the connector 20/control line 28 is exposed to tensile loading.

Figure 3:
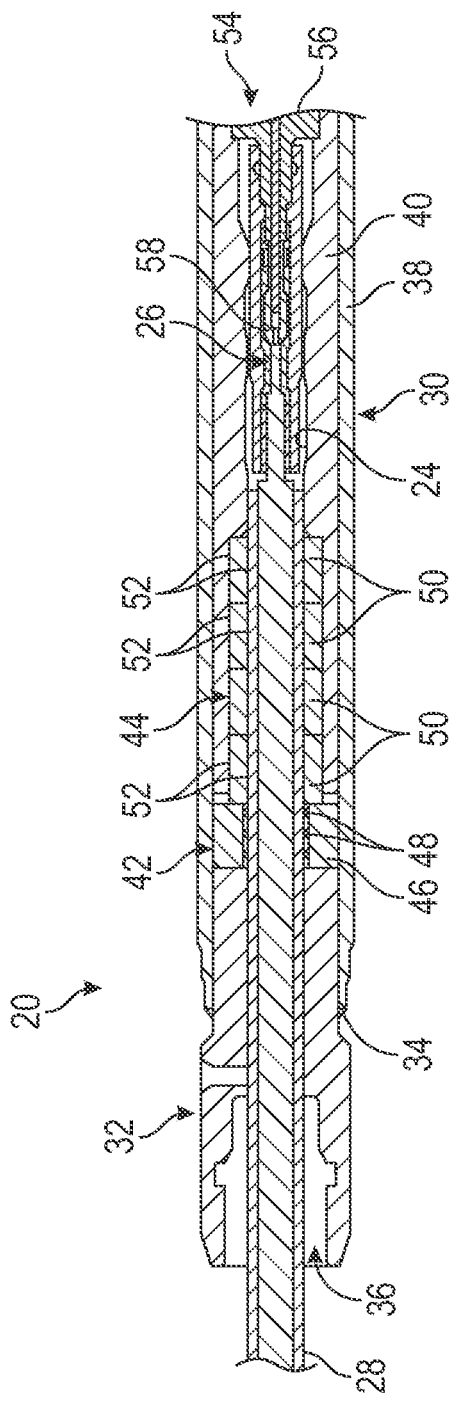
FIG. 3 is a cross-sectional illustration of another embodiment of a connector for connecting components utilized in a downhole environment, according to an embodiment of the disclosure

Referring generally to FIG. 3, another embodiment of connector 20 is illustrated. In this embodiment, many of the components are the same or similar and have been labeled with common reference numerals. In this particular application, however, a section of the control line 28 is coupled, via connector 20, with another type of device 54.

According to the illustrated embodiment, the device 54 is in the form of a gauge 56 which is electrically coupled with an electrical control line 28 at coupling 26 via a gauge electrical connector 58. However, device 54 may comprise other types of devices which may be coupled to control line 28 via connector 20. In many of these applications, the connector 20 may be used to form a permanent, sealed connection, with substantial resistance to tensile loading.

Figure 4:
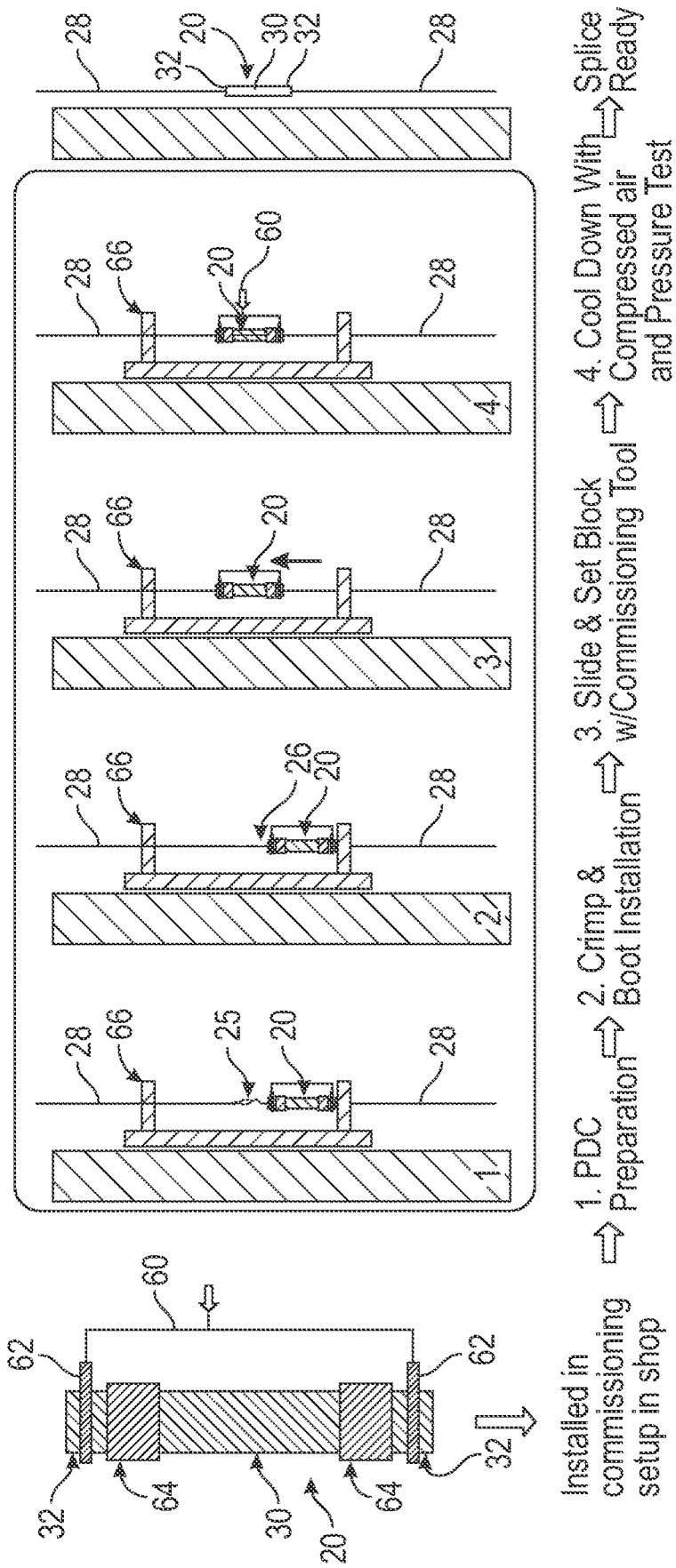
FIG. 4 is an illustration showing an example of a connector installation procedure which may be used in the field or at another suitable location, according to an embodiment of the disclosure.

Referring generally to FIG. 4, an illustration is provided of a field installation method for utilizing connector 20 in joining sections of control line 28. In this example, control line 28 may be in the form of permanent downhole cable (PDC). As illustrated, the connector 20 may be combined with a pressure test line 60 linked with the connector 20 via pressure couplers 62. Additionally, heating collars 64 may be positioned about external housing 30 of connector 20 proximate coupler ends 32 to facilitate application of heat in a manner which activates the shape memory alloy material of the sealing system 42 and the retainer system 44.

Initially, the sections of control line 28 are mounted in an installation jig 66. The connector 20 is then slid onto one section of the control line 28. In the illustrated configuration, conductors, e.g. wires 25, of the two sections of control line 28 are placed in proximity to each other (see configuration 1). The wires/conductors are then joined to form coupling 26 via, for example, a crimp and boot installation or splice (see configuration 2).

At this stage, the connector 20 may be slid over the coupling 26 and heat may be applied to the connector 20 via a heating tool or by heating the surrounding environment (see configuration 3). The heating activates the sealing system 42 and the retainer system 44 to both seal the connector 20 and retain the sections of control line 28 in a joined configuration by resisting tensile loading. For example, the application of heat may be used to cause the ring clamps 46 and the retainer rings 50 to transition to original, radially expanded configurations which securely seal and grip the sections of control line 28. At this stage, the connector 20 may be cooled via compressed air or other suitable cooling technique and pressure tested via pressure test line 60 to ensure the splice is completed and ready for use in a downhole environment (see configuration 4).

Depending on the environment and parameters of a given operation, the connector may be constructed in various configurations and sizes. The sealing system and retainer system may be constructed from individual rings, a plurality of rings, or from other suitable structures able to achieve the desired sealing and gripping functionality on both sides of coupling 26. The shape memory material may be constructed from various metal alloys which are able to transition to another desired shape upon activation. Depending on the type of shape memory material, the activation technique may involve application of different levels of heat for appropriate time periods. Other types of materials may be activated via other suitable techniques.

In some configurations, systems and methods according to the present disclosure, for example as shown in and described with respect to FIGS. 1-4, can be specifically adapted to and used to form hydraulic dry mate connections. FIGS. 6A-6B show an example hydraulic dry mate connector used to connect two pieces or sections of hydraulic control lines 28. The connector of FIGS. 6A-6B is substantially the same as the connector of FIG. 2, and components that are the same or similar have been labeled with common reference numerals. In some configurations, the fluid media is in direct contact with the SMA (shape memory alloy) rings as the ends of the hydraulic lines 28 are not sealed to each other within the connector. For example, fluid media may pass radially between the control line 28 section and the retainer ring(s) 50.

Figure 7A:
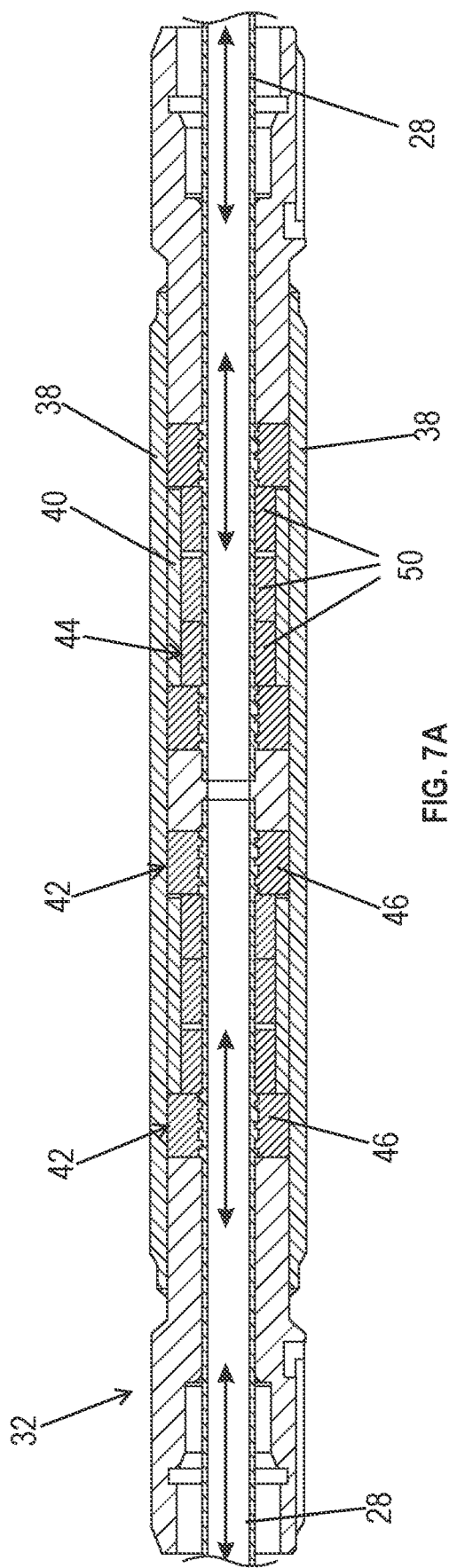
FIG. 7A illustrates a longitudinal cross-section of another example of a hydraulic dry mate connector.
Figure 7B:
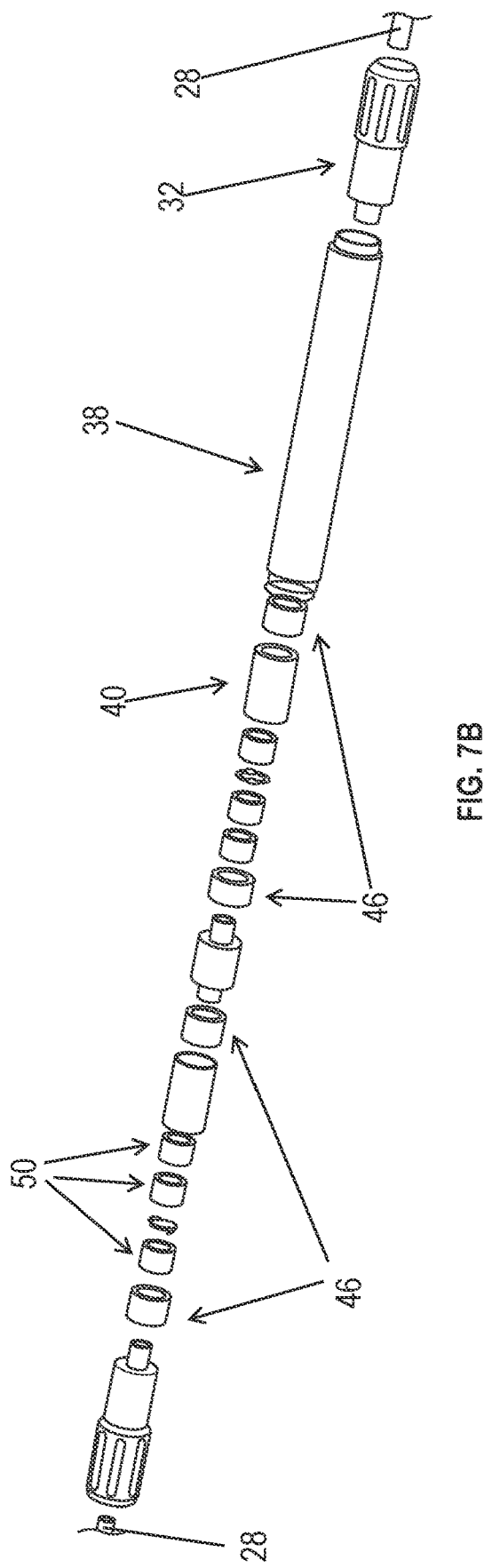
FIG. 7B illustrates an exploded view of the connector of FIG. 7A.

FIGS. 7A-7B illustrate another example of a hydraulic dry mate connector. In this configuration, the sealing system 42 includes a second set of ring clamps 46 or other sealing components. As shown, each side of the connector includes one or more retainer rings 50. In other words, the connector includes one or more retainer rings 50 associated with each of the sections of control line 28. On each side of the connector, the one or more retainer ring(s) 50 are axially bounded by sealing components 46 at each axial end. In other words, in the illustrated configuration, the left side of the connector includes one or more retainer ring(s) 50 disposed axially between two ring clamps 46, and the right side of the connector likewise includes one or more retainer ring(s) 50 disposed axially between two ring clamps 46. The ring clamps 46 or sealing elements disposed toward the axial middle of the connector form a seal between the control line 28 segments and the housing 30 to advantageously prevent or inhibit the fluid from leaking from the ends of the control lines 28 within the connector into contact with the retainer ring(s) 50. As shown, the housing 30 can include an outer housing section 38 and an inner housing or subsection 40 disposed radially between the outer housing section 38 and each of the sets of retainer ring(s) 50.

In the configuration of FIGS. 7A-7B, the rings 50 are fully protected from any fluid to prevent, inhibit, or reduce the likelihood of the rings 50 deteriorating over time due to contact with the fluid media circulating in the control lines. This configuration could also be considered as or to have a redundant barrier. If the first barrier, e.g., one of the sealing components 46, fails, there is a second barrier, e.g., the other sealing component 46 on that respective side. As described herein, the ring clamps 46 may be constructed of the shape memory alloy material and the sealing teeth 48 may be constructed of a different type of material. In the configuration of FIGS. 7A-7B, the SMA components themselves (the retaining rings 50 and/or the SMA portion of the ring clamps 46) are not directly exposed to the fluid media, which can advantageously make the assembly more robust over the years.

The connectors of FIGS. 6A-6B and 7A-7B allow for hydraulically testing the connections before running downhole.

In use, the SMA can be activated by applying a specific heating profile during a short period of time, which can reduce the time needed for operation.

Additional details, for example, regarding dry mate connectors and the use of shape memory alloys, can be found in, e.g., PCT Publication No. WO 2020/087001 and US Publication No. 2010/0006303, the entirety of each of which is hereby incorporated by reference herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A dry mate connector comprising:
a connector body comprising a first axial end and a second axial end, the first axial end configured to receive an end portion of a first control line, and the second axial end configured to receive an end portion of a second control line;
a first set of one or more retainer rings disposed radially between the end portion of the first control line and the connector body;
a second set of one or more retainer rings disposed radially between the end portion of the second control line and the connector body, wherein the retainer rings of the first and second sets of one or more retainer rings each comprise internal and external gripping surfaces and a first shape memory alloy material selectively activatable to grip the end portions of the first and second control lines, respectively;
a first pair of annular sealing components, one of the first pair of annular sealing components disposed at each axial end of the first set of one or more retainer rings such that the first set of one or more retainer rings is axially bounded by the first pair of annular sealing components, the first pair of annular sealing components disposed radially between the end portion of the first control line and the connector body; and
a second pair of annular sealing components, one of the second pair of annular sealing components disposed at each axial end of the second set of one or more retainer rings such that the second set of one or more retainer rings is axially bounded by the second pair of annular sealing components, the second pair of annular sealing components disposed radially between the end portion of the second control line and the connector body,
wherein the annular sealing components of the first and second pairs of annular sealing components each form a central bore and comprise a second shape memory alloy material selectively activatable to seal against the end portions of the first and second control lines, respectively,
wherein each of the annular sealing components of the first and second pairs of annular sealing components comprises a ring clamp having internal sealing teeth, and
wherein the internal sealing teeth of each of the annular sealing components of the first and second pairs of annular sealing components consist of a non-shape memory alloy material.

2. The connector of claim 1, wherein the first and second shape memory alloy materials are the same.

3. The connector of claim 1, wherein the first and second shape memory alloy materials each comprise a metal alloy material activatable via application of heat.

4. The connector of claim 1, wherein the first shape memory alloy material is selectively activatable to expand the retainer rings of the first and second sets of one or more retainer rings radially against both the connector body and the first and second control lines.

5. The connector of claim 1, wherein the second shape memory alloy material is selectively activatable to expand the annular sealing components of the first and second pairs of annular sealing components radially against both the connector body and the first and second control lines.

6. The connector of claim 1, wherein the ring clamps comprise the second shape memory alloy material.

7. The connector of claim 6, wherein the second shape memory alloy material is a metal alloy material activatable via application of heat.

8. The connector of claim 1, wherein the connector body comprises an outer housing section and two inner housing sections, wherein one of the inner housing sections is disposed radially between the first set of retaining rings and the outer housing section, and the other inner housing section is disposed radially between the second set of retaining rings and the outer housing section.

9. The connector of claim 1, wherein the connector is a hydraulic dry mate connector and the first and second control lines are first and second hydraulic lines.

* * * * *